(12) United States Patent
Saha et al.

(10) Patent No.: US 10,789,507 B2
(45) Date of Patent: Sep. 29, 2020

(54) RELATIVE DENSITY-BASED CLUSTERING AND ANOMALY DETECTION SYSTEM

(71) Applicant: Walmart Apollo, LLC, Bentonville, AR (US)

(72) Inventors: Diptarka Saha, Malda (IN); Debanjana Banerjee, Kolkata (IN); Bodhisattwa Prasad Majumder, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 265 days.

(21) Appl. No.: 15/977,167

(22) Filed: May 11, 2018

(65) Prior Publication Data

US 2019/0303710 A1 Oct. 3, 2019

(30) Foreign Application Priority Data

Mar. 30, 2018 (IN) .............................. 201841012054

(51) Int. Cl.
| | | |
|---|---|---|
| *G06F 17/30* | (2006.01) | |
| *G06K 9/62* | (2006.01) | |
| *G06F 11/07* | (2006.01) | |
| *G06F 16/9038* | (2019.01) | |

(52) U.S. Cl.
CPC ........ *G06K 9/6215* (2013.01); *G06F 11/0766* (2013.01); *G06F 16/9038* (2019.01); *G06K 9/623* (2013.01); *G06K 9/6218* (2013.01)

(58) Field of Classification Search
None
See application file for complete search history.

(56) References Cited

U.S. PATENT DOCUMENTS

| | | | |
|---|---|---|---|
| 6,268,587 B1 * | 7/2001 | Kooken | B23K 9/091 |
| | | | 219/130.32 |
| 7,046,247 B2 | 5/2006 | Hao et al. | |
| 8,090,721 B2 | 1/2012 | Fogel | |
| 9,336,484 B1 | 5/2016 | Iverson | |
| 9,589,045 B2 | 3/2017 | Levitan et al. | |
| 2003/0088591 A1 * | 5/2003 | Fish | G06F 16/9574 |

(Continued)

FOREIGN PATENT DOCUMENTS

CN 105824853 A 8/2016

OTHER PUBLICATIONS

Lian Duan, "Density-Based Clustering and Anomaly Detection", Business Intelligence—Solution for Business Development, www.intechopen.com, Feb. 1, 2012, 19 pages.

*Primary Examiner* — Hung D Le

(57) ABSTRACT

Examples provide a system for detecting anomalies in a dataset. The system includes one or more processors and a memory storing the dataset. The one or more processors are programmed to identify a first set of data points in a cluster, identify a second set of data points outside of the cluster as noisy data points, and determine whether each of the noisy data points is an anomaly by: determining a distance between the noisy data point and other data points in the dataset, ranking the distances between the noisy data point and the other data points, and applying a weight to each of the ranked distances to determine an outlier value for the noisy data point. When the outlier value for the noisy data point exceeds a threshold, the noisy data point is identified as an anomaly, and result is displayed in a user interface.

20 Claims, 6 Drawing Sheets

(56) References Cited

U.S. PATENT DOCUMENTS

| | | | |
|---|---|---|---|
| 2012/0151260 A1* | 6/2012 | Zimmermann | G11C 16/3431 714/16 |
| 2015/0067090 A1* | 3/2015 | Resch | G06F 3/067 709/213 |
| 2015/0161148 A1* | 6/2015 | Randell | G06F 3/0608 707/662 |
| 2015/0293992 A1 | 10/2015 | Meehan et al. | |
| 2017/0061322 A1* | 3/2017 | Chari | G06F 21/55 |
| 2017/0193078 A1 | 7/2017 | Limonad et al. | |
| 2018/0095004 A1* | 4/2018 | Ide | G01M 13/00 |

\* cited by examiner

RELATIVE DENSITY-BASED CLUSTERING AND ANOMALY DETECTION SYSTEM

BACKGROUND

Clustering processes are used quite often for class identification in spatial databases. However, an application to large spatial databases requires a need of domain knowledge to determine input parameters, discovery of clusters with arbitrary shape, and efficiency. While conventional density-based spatial clustering processes may be able to discover clusters with different shapes with limited input parameters, these conventional clustering processes fail to accurately identify clusters that have varying densities. For example, data points that are spread out may be too sparse for conventional processes to identify each of the data points as belonging to a cluster, and as a result, one or more of these data points are incorrectly identified as noisy data points (data points not belonging to a cluster). Further, a plurality data points that are too dense may be over-segmented and result in a plurality of clusters being identified instead of a single cluster with multiple core data points. These problems are compounded as the shape of a cluster is irregular/varied, as the data set size increases, and as the type of data within the data set varies.

Clustering processes may be used to detect anomalies in a dataset. The efficient processing and monitoring of large amounts of data for anomalies is becoming increasingly important as governments, businesses, entities and individuals store and/or require access to growing amounts of data. Typically, the anomalous items will translate to a problem, such as bank fraud, a structural defect, software faults, medical problems, product defects, and many others. However, conventional anomaly detection using clustering processes perform poorly in datasets that include varying densities or when datasets consist of clusters with irregular/varying shapes. That is, when a cluster is not properly identified, the anomalies that stem from the identification of the clusters are also not properly identified.

SUMMARY

Some examples provide a computer-implemented method for identifying anomalies in a dataset. The method includes identifying a first set of data points in a cluster and identifying a second set of data points outside of the cluster as noisy data points. For each of the noisy data points, a determination is made as to whether the noisy data point is an anomaly. A distance between the noisy data point and other data points in the dataset is determined and the distances between the noisy data point and the other data points in the dataset are ranked. Next, a weight is applied to each of the ranked distances to determine an outlier value for the noisy data point. When the outlier value for the noisy data point exceeds a threshold, the noisy data point is identified as an anomaly data point, and a result, which includes each of the noisy data points in the dataset identified as an anomaly data point, is displayed on a user interface.

Other examples provide a system for detecting anomalies in a dataset. The system includes one or more processors and a memory storing the dataset. The one or more processors are programmed to identify a first set of data points in a cluster and identify a second set of data points outside of the cluster as noisy data points. For each of the noisy data points, the one or more processors are programmed to determine whether the noisy data point is an anomaly by: determining a distance between the noisy data point and other data points in the dataset, ranking the distances between the noisy data point and the other data points in the dataset, and applying a weight to each of the ranked distances to determine an outlier value for the noisy data point. When the outlier value for the noisy data point exceeds a threshold, the noisy data point is identified as an anomaly. The one or more processors are programmed to display a result in a user interface, wherein the result includes each of the noisy data points in the dataset identified as an anomaly data point.

Yet other examples provide one or more computer storage media, having computer-executable components for detecting anomalies in a dataset. The computer-executable components include a data point component that when executed by one or more processors causes the one or more processors to identify a first set of data points in a cluster and identify a second set of data points outside of the cluster as noisy data points. An anomaly detection component that when executed by the one or more processors causes the one or more processors to, for each of the noisy data points, determine whether the noisy data point is an anomaly by determining a distance between the noisy data point and other data points in the dataset, ranking the distances between the noisy data point and the other data points in the dataset, and applying a weight to each of the ranked distances to determine an outlier value for the noisy data point. When the outlier value for the noisy data point exceeds a threshold, the anomaly detection component further causes the one or more processors to identify the noisy data point as an anomaly. The computer-executable components further include a display component that when executed by the one or more processors cause the one or more processors to display a result in a user interface, wherein the result includes each of the noisy data points in the dataset identified as an anomaly data point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Density-based clustering methods have an advantage of discovering clusters with arbitrary shapes and dealing with noisy data. However, conventional density-based clustering methods have challenges. For example, traditional density measures are not adaptive to datasets with complex distribution. That is, clusters with different shapes, sizes, densities, and scales. In addition, the performance of conventional methods is sensitive to parameter selection, and to set these parameters properly for different datasets is quite difficult and thus burdensome on a user.

Aspects of the disclosure address the above problems by providing systems and methods that enable a more accurate identification of clusters that vary in density, patterns, size, and shape. Thus, clusters that have variety of shapes with relatively low density as well as relatively high density can be accurately identified, when compared to conventional systems and methods. For example, while conventional methods may not identify a core data point in a sparse cluster (or even identify a sparse cluster at all), the system and methods described herein not only identify the core data point in a sparse cluster, but also enable anomalies of the data points in the cluster to be more accurately identified. Thus, the systems and methods described herein not only improve the functioning of a computing device by reducing processing costs of the computing device (e.g., improper clustering/labeling of datasets in the conventional systems/methods requires additional computations to compensate for these deficiencies), the systems and methods enable the information provided to a user to be more manageable/comprehensible.

Figure 1:
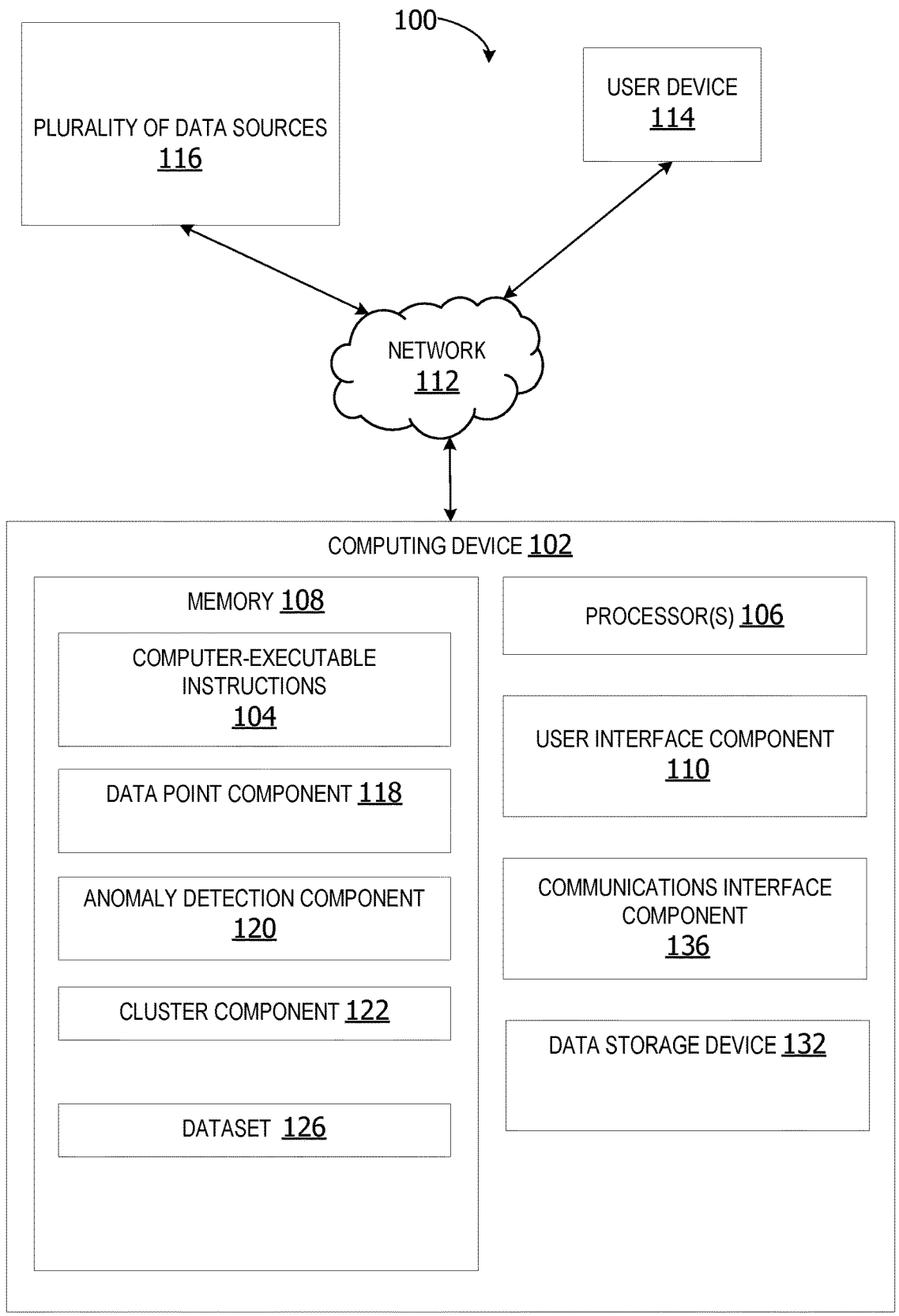
FIG. 1 is an exemplary block diagram illustrating a computing device for identifying clusters of data points from a dataset based on density and identifying anomalies in the dataset.

Referring to FIG. 1, an exemplary block diagram illustrates a system 100 for identifying clusters having varying densities and using the identified clusters to detect anomalies. In the example of FIG. 1, a computing device 102 represents any device executing computer-executable instructions 104 (e.g., as application programs, operating system functionality, or both) to implement the operations and functionality associated with the computing device 102.

The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, industrial control devices, wireless charging stations, and electric automobile charging stations. Additionally, the computing device 102 may represent a group of processing units or other computing devices.

In some examples, the computing device 102 has processor(s) 106, a memory 108, and at least one user interface 110. The processor(s) 106 include any quantity of processing units and is programmed to execute computer-executable instructions 104. The computer-executable instructions 104 may be performed by the processor(s) 106, or by multiple processors within the computing device 102, or performed by a processor external to the computing device 102. In some examples, the processor(s) 106 is programmed to execute instructions such as those illustrated in the figures (e.g., FIG. 5 and FIG. 6).

In some examples, the processor(s) 106 represents an implementation of analog techniques to perform the operations described herein. For example, the operations may be performed by an analog computing device and/or a digital computing device.

The computing device 102 further has one or more computer-readable media such as the memory 108. The memory 108 includes any quantity of media associated with or accessible by the computing device 102. The memory 108 may be internal to the computing device 102 (as shown in FIG. 1), external to the computing device (not shown), or both (not shown). In some examples, the memory 108 includes read-only memory and/or memory wired into an analog computing device.

The memory 108 stores data, such as dataset 126 and/or one or more applications. The applications, when executed by the processor(s) 106, operate to perform functionality on the computing device 102. The applications may communicate with counterpart applications or services such as web services accessible via a network 112. For example, the applications may represent downloaded client-side applications that correspond to server-side services executing in a cloud.

In some examples, the user interface component 110 includes a graphics card for displaying data to a user and receiving data from the user. The user interface component 110 may also include computer-executable instructions (e.g., a driver) for operating the graphics card. Further, the user interface component 110 may include a display (e.g., a touch screen display or natural user interface) and/or computer-executable instructions (e.g., a driver) for operating the display. The user interface component 110 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device 102 in a way.

The network 112 is implemented by one or more physical network components, such as, but without limitation, routers, switches, network interface cards (NICs), and other network devices. The network 112 may be any type of network for enabling communications with remote computing devices, such as, the user device 114 or the plurality of data sources 116. The plurality of data sources 116 may include one or more POS devices, one or more data storage devices, databases, cloud storage, or any other data.

The network 112 may include, but is not limited to, a local area network (LAN), a subnet, a wide area network (WAN), a wireless (Wi-Fi) network, or any other type of network. In this example, the network 112 is a WAN, such as the Internet. However, in other examples, the network 112 may be a local or private LAN.

The memory 108, in this non-limiting example, stores one or more components, such as a data point component 118, an anomaly detection component 120, and/or a cluster component 122. The system 100 may optionally include a data storage device 132.

The data storage device 132 may include a set of one or more data storage devices storing data. The data storage device may include one or more types of data storage devices, such as, for example, one or more rotating disks drives, one or more solid-state drives (SSDs), and/or any other type of data storage device. The data storage device in some non-limiting examples includes a redundant array of independent disks (RAID) array. In other examples, the data storage device includes a database.

In this example, the data point component 118, the anomaly detection component 120, and the cluster component 122 are stored on the memory 108. However, in other examples, one or more of the components may be stored remotely on a cloud server or remote computing device. In these examples, the computing device 102 accesses the data point component 118, the anomaly detection component 120, and the cluster component 122 via the network 112.

The data point component 118, when executed by the processor(s) 106, causes the processor(s) 106 to detect core data points in a dataset 126. The examples described herein may be applied to a variety of datasets, for example, datasets corresponding to product substitutions, software faults, user transactions, data consumption, system diagnostics, and the like.

In some examples, the core data points in the dataset 126 are detected by determining a relative density of each point in the dataset 126 by using the following equations:

$$\rho(x) = \frac{1}{n} \sum_{\{X_i \in N_k(x)\}} \frac{1}{h_i} K\left(\frac{x - X_i}{h_i}\right)$$

And $$sc\_\rho(x) = \frac{(\rho(x) - med_{\{X_i \in N_k(x)\}}(\rho(X_i)))}{MAD_{\{X_i \in N_k(x)\}}(\rho(X_i))}$$

For a point p amongst a given set of points in the dataset 126, a k-Neighborhood $N_k$ is defined as a set of k points which are closest to the point p with respect to Euclidean norm. The points in the neighborhood are known as neighbors of p. Finding a threshold $\theta_1$ based on a bootstrap distribution of the vector sc_ρ, a point p is identified as a core data point iff sc_ρ(p)≥$\theta_1$. In some examples, the threshold $\theta_1$ is user defined.

Figure 2:
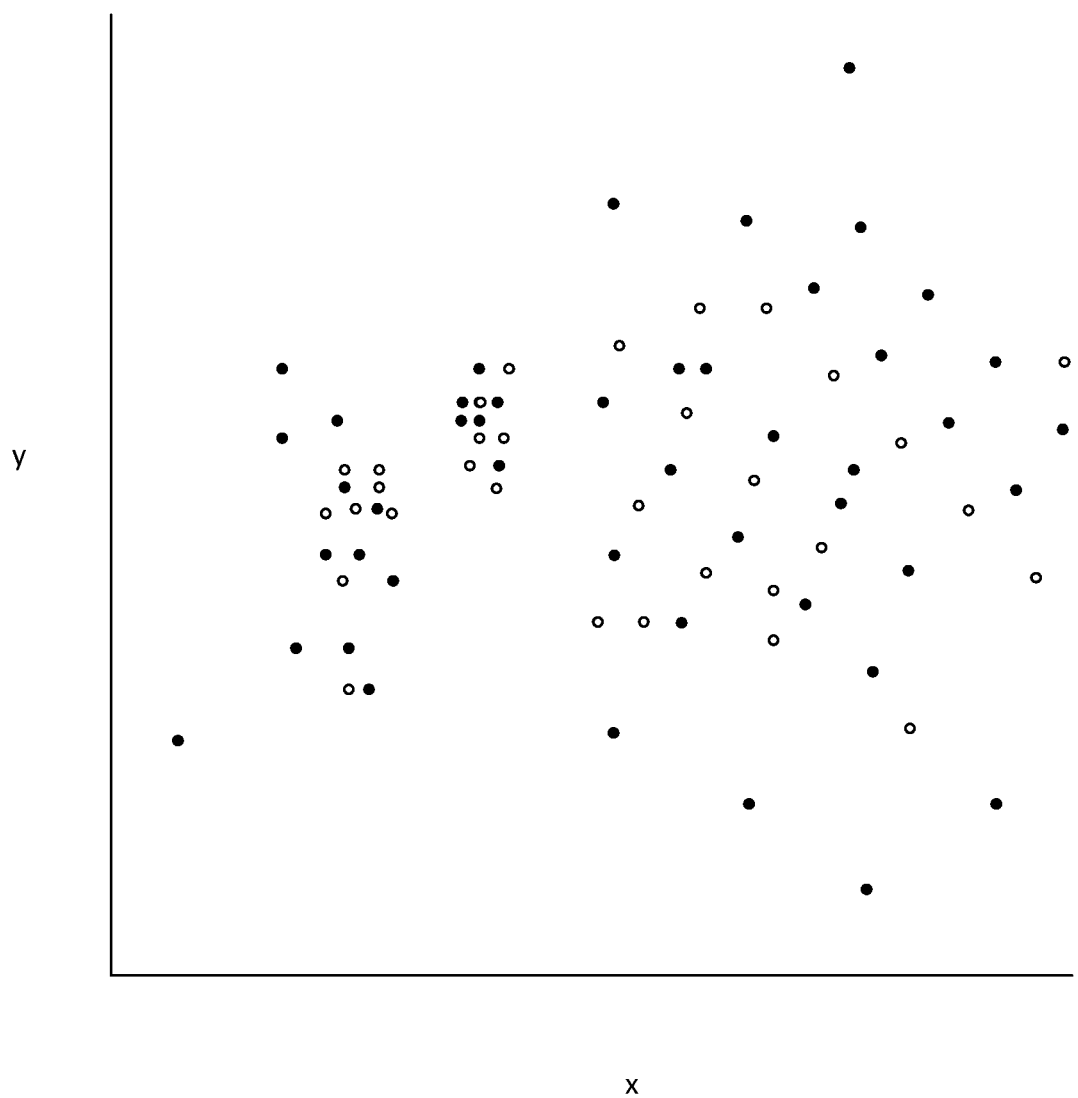
FIG. 2 is an exemplary graph illustrating identification of core data points and non-core data points.

With reference now to FIG. 2, a graph 200 is provided illustrating data points that have been identified as core data points and data points that have been identified as non-core data points by the data point component 118. Utilizing the equations provided above, core data points can be accurately identified, and therefore clusters can be accurately identified, with datasets that have varying densities (e.g., sparse data sets) and datasets that result in arbitrary shapes and sizes.

In some examples, based at least on a relative density of a cluster, the cluster component 122 causes the processor(s) 106 to assign a first set of data points in the dataset 126 to the cluster. The cluster component 122 further causes the processor(s) 106 to determine distances between the core data points and a threshold quantity of other data points in the dataset 126, and based at least on the determined distances, assigns the relative density to the cluster and assigns the threshold quantity of data points to the cluster based at least in part on the relative density. The cluster component 122 repeats this process until every point in the dataset 126 is visited. That is, each data point should be identified as a core data point (e.g., a data point that is part of a cluster), or a as a non-core data point (e.g., a data point that is not a core data point). As discussed in further detail below with reference to FIG. 3, a non-core data point is further defined as a non-core data point that is part of a cluster, or as noisy data point (e.g., a data point that is neither a core data point or a non-core data point that is part of cluster).

Figure 3:
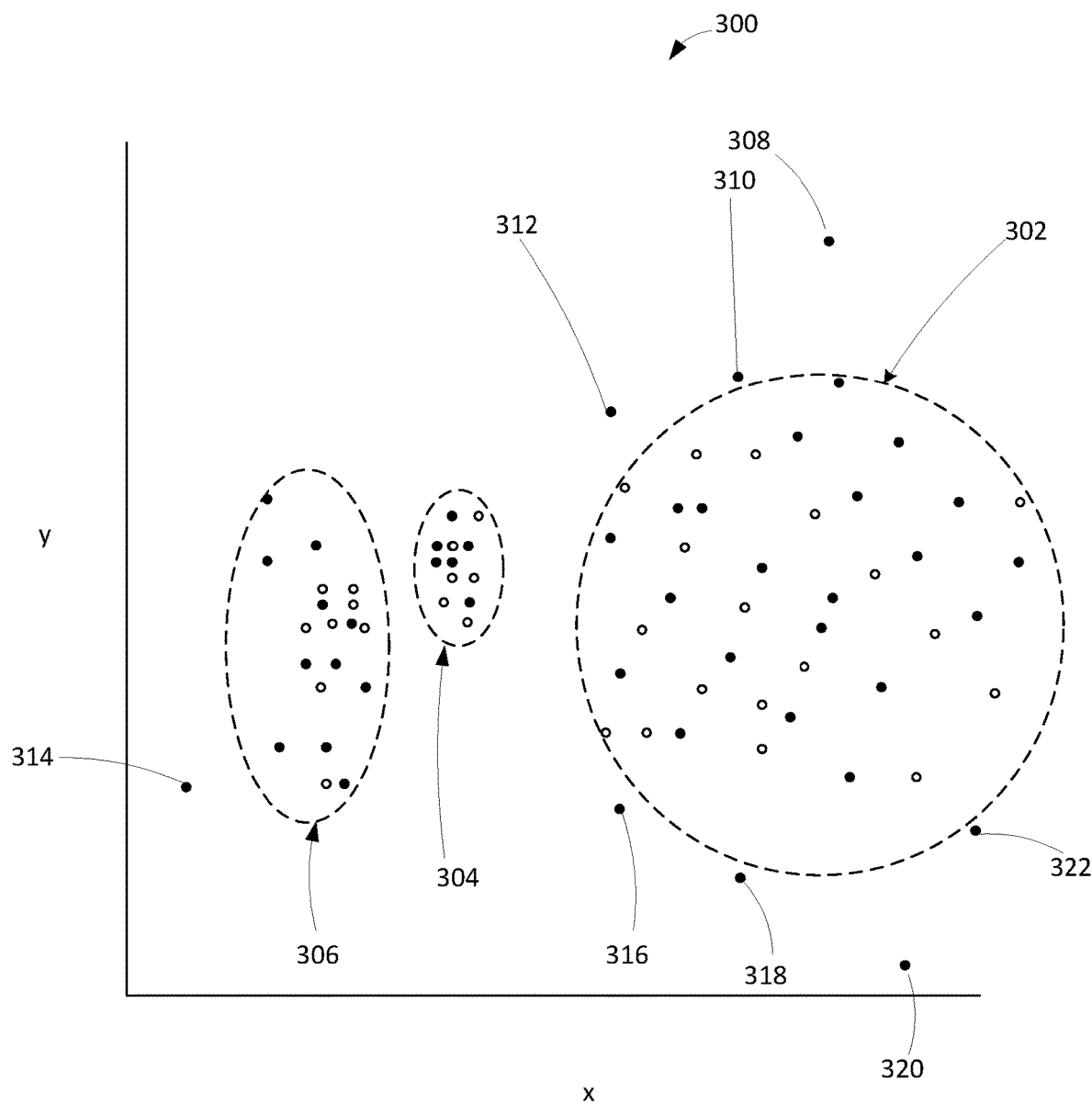
FIG. 3 is an exemplary graph illustrating an identification of clusters of data points from a dataset based on density.

With reference now to FIG. 3, a graph 300 is provided illustrating a plurality of clusters (e.g. cluster 302, 304, and 306) with varying densities formed by the cluster component 122 around data points that have been identified as core data points and/or non-core data points that have been identified as belonging to a cluster. All points that are not identified as belonging to one of the corresponding clusters (e.g., points 308, 310, 312, 314, 316, 318, 320, 322) are identified as a noisy data point by the data point component 118. For example, after the clusters are determined, n clusters $C_1$, $C_2$, ..., $C_n$ are provided. Thus, there are data points, such as p, which are not part of any cluster, i.e. p∈$(C_1 \cup C_2 \cup ... \cup C_n)^c$. The data point component 118 identifies this second set of data points as noisy data points, and this set is denoted by the letter $\aleph = (C_1 \cup C_2 \cup ... \cup C_n)^c$.

After the noisy data points are identified, the anomaly detection component 120, when executed by the processor(s) 106, causes the processor(s) 106 to determine which of the noisy points in the second set of data points are anomaly data points (e.g., outliers). For a point p, the "outlierness" (e.g., the greater a distance a point is from other data points) is defined by the following equation:

$$O(p) = \frac{\left(\sum_{\{q \in N_k(p)\}} w(q) rank_q(p)\right)}{|N_k(p)|}$$

Where, w is an appropriate weight, an "outlierness" of a point is a weighted average of the point's rank with respect to its neighbors (e.g., next closest points). In one example, the weight is defined by the following equation:

$$w(q) = \begin{cases} \frac{1}{n_j} & \text{if } w \in C_j \text{ and } |C_j| = n_j \\ 1 & \text{if } w \in \aleph \end{cases}$$

In this example, if q is part of any cluster, the weight is a cardinality of that cluster and if q is a noisy point, then the weight is 1.

In another example, the weight is defined by the following equation:

$$w(q) = \begin{cases} \frac{\sigma_j}{\sum_i \sigma_i} & \text{if } w \in C_j \text{ and } SD(C_j) = \sigma_j \\ 1 & \text{if } w \in \aleph \end{cases}$$

In this other example, if q is part of any cluster, the weight is proportional to a standard deviation of that cluster, and if q is a noisy point, then the weight is 1. Here, $\Sigma_i \sigma_i$ is the sum of standard deviations of all clusters $C_1$, $C_2$, ..., $C_n$.

Further, with respect to $rank_q$. There are two points p, q. Now, consider a sphere being drawn (of appropriate dimension) with center at q and radius |p−q|. The number of points that are in that sphere will be a rank of p with respect to q. It can be understood that the number of points one needs to cross while going from q to p, and thus a rank can be defined by the following equation:

$$rank_q(p) = |\{X_i | q - X_i| < |q - p|\}|$$

For all the identified noisy points, the anomaly detection component 120 causes the processors(s) 106 to determine their "outlierness" and determines a suitable threshold $\theta_2$, again based on bootstrap distribution. In some examples, the threshold may be defined by a user. The anomaly detection component 120 further causes the processor(s) 106 to identify a noisy point p as an outlier iff O(p)≥$\theta_2$.

In some examples, the anomaly detection component 120 causes the processor(s) 106 to determine whether the noisy data points are an anomaly by: determining a distance between the noisy data point and other data points in the dataset, ranking the distances between the noisy data point and the other data points in the dataset, and applying a weight to each of the ranked distances to determine an outlier value for the noisy data point. When the outlier value for the noisy data point exceeds a threshold, identifying the noisy data point as an anomaly.

Figure 4:
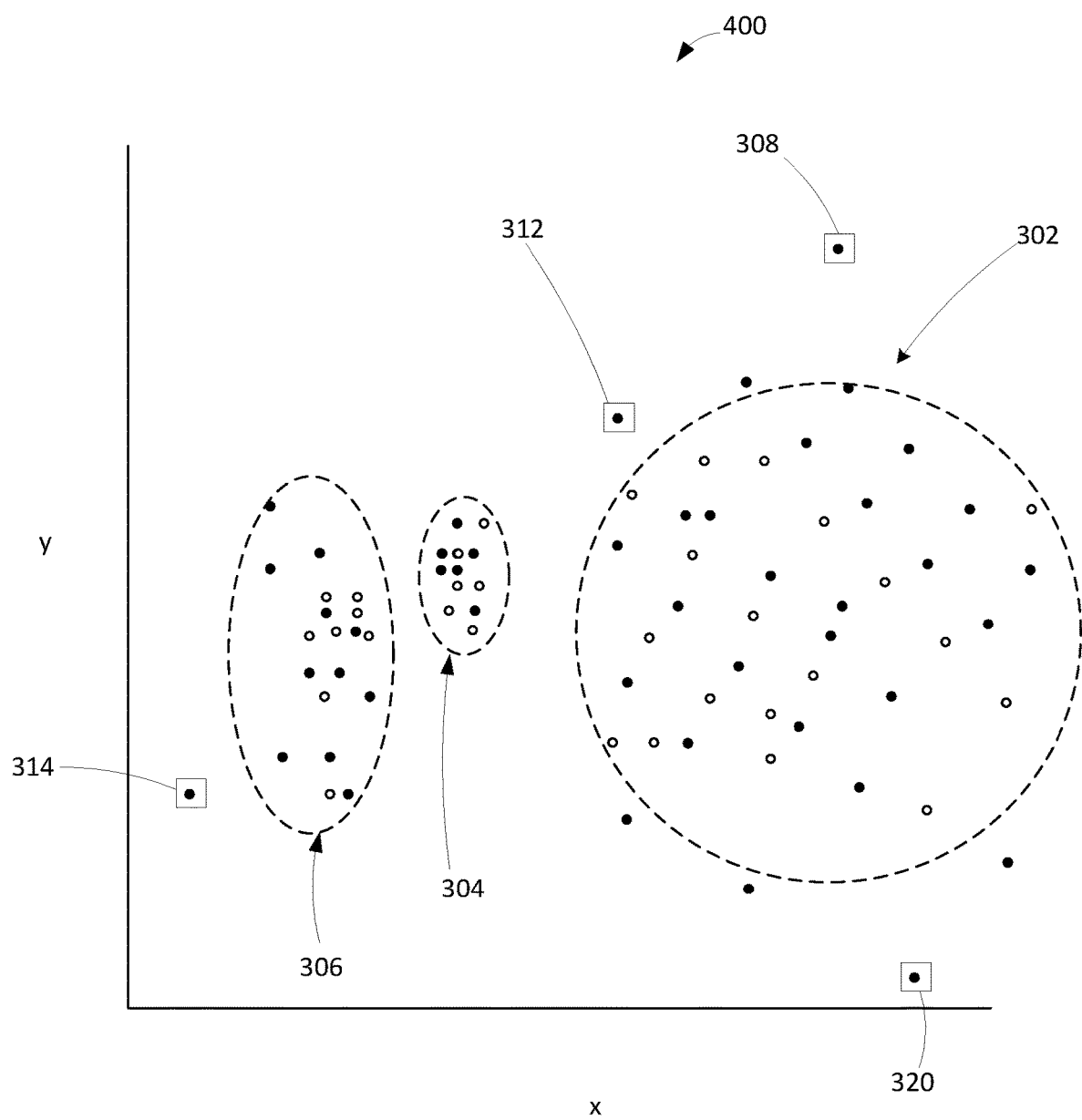
FIG. 4 is an exemplary graph illustrating an identification of anomaly data points from a dataset.

With reference now to FIG. 4, a graph 400 is provided illustrating that noisy data points 308, 312, 314, and 320 from FIG. 3 are now identified as anomaly data points (e.g., outliers).

The user interface component 110 causes the processor(s) 106 to display a result in a user interface. In one example, the result includes each of the noisy data points in the dataset identified as an anomaly data point.

In some examples, the computing device 102 includes a communications interface component 136. The communications interface component 136 may include a network interface card and/or computer-executable instructions (e.g., a driver) for operating the network interface card. Communication between the computing device 102 and other devices, such as the user device 114, may occur using any protocol or mechanism over any wired or wireless connection. In some examples, the communications interface component 136 is operable with short range communication technologies such as by using near-field communication (NFC) tags.

Figure 5:
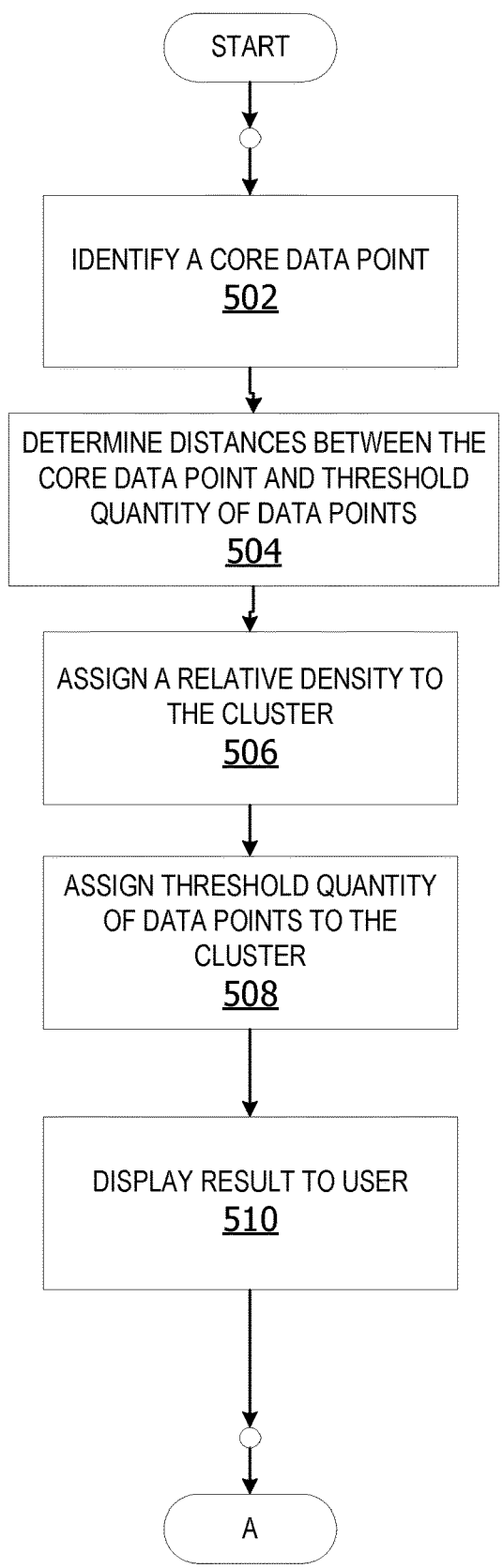
FIG. 5 is an exemplary flow chart illustrating operations of the computing device to identify clusters of data points from a dataset based on density.

With reference now to FIG. 5, an exemplary flow chart 500 illustrating an operation of the computing device 102 in FIG. 1 to form a cluster based on a density of a set of data points is provided. The process shown in FIG. 5 may be performed by the data point component 118 and the cluster component 122 executing on the computing device 102.

At 502, a core data point from a dataset (e.g., the dataset 126) is identified. Each cluster has at least one core data point within the cluster. Thus, if a core data point is not properly identified (e.g., based on sparseness or a shape of a set of data points), a proper cluster is not provided. As explained above, conventional clustering methods have difficulty identifying clusters (and thus core data points) with respect to clusters with varying densities and/or shapes. Utilizing the equations provided herein, for a point p amongst a given set of points in the dataset 126 and a threshold $\theta_1$ based on a bootstrap distribution of the vector sc_$\rho$, a point p is identified as a core data point iff sc_$\rho$(p)$\geq\theta_1$.

At 504, distances between the identified core data point and a threshold quantity of data points (e.g., nearest-neighbor) in the dataset 126 is determined. Based at least on the determined distances, a relative density to the cluster is assigned at 506. At 508, the threshold quantity of data points is assigned to the cluster based at least in part on the relative density. That is, a threshold quantity of data points may need to be assigned to a cluster/core data point before a cluster is identified. In some examples, this threshold is defined by a user. In other examples, based at least on a relative density of a second cluster, another set of data points in the dataset 126 are assigned to the second cluster. In this example, the relative density of the second cluster is different than the relative density of the cluster. At 510, the cluster is displayed to a user by the user interface component 110. In one example, the presentation of the cluster is provided as a graph on a display, for example, as shown in FIGS. 3 and 4. This enables a user to accurately (and quickly) identify data points within a cluster as well as data points outside of a cluster (e.g., noisy data points). In some embodiments, a user may "hover" over a particular data point using a mouse/curser or a pen in case of touch screen. By hovering over a data point, information regarding the data point may be displayed to the user, for example, what the data point represents (e.g., type of data), if the data point is a core data point, a noisy data point, or an anomaly. Further, information regarding which cluster the data point belongs to may also be presented.

By defining a cluster based on relative density, the systems and methods described herein enable proper identification of low-density cluster, in contrast to conventional systems and methods, which confuse low-density clusters as noise. Improper identification of clusters and thus noisy data points, decreases the accuracy of anomaly detection within the dataset. As explained above, the systems and methods described herein overcome these problems.

Figure 6:
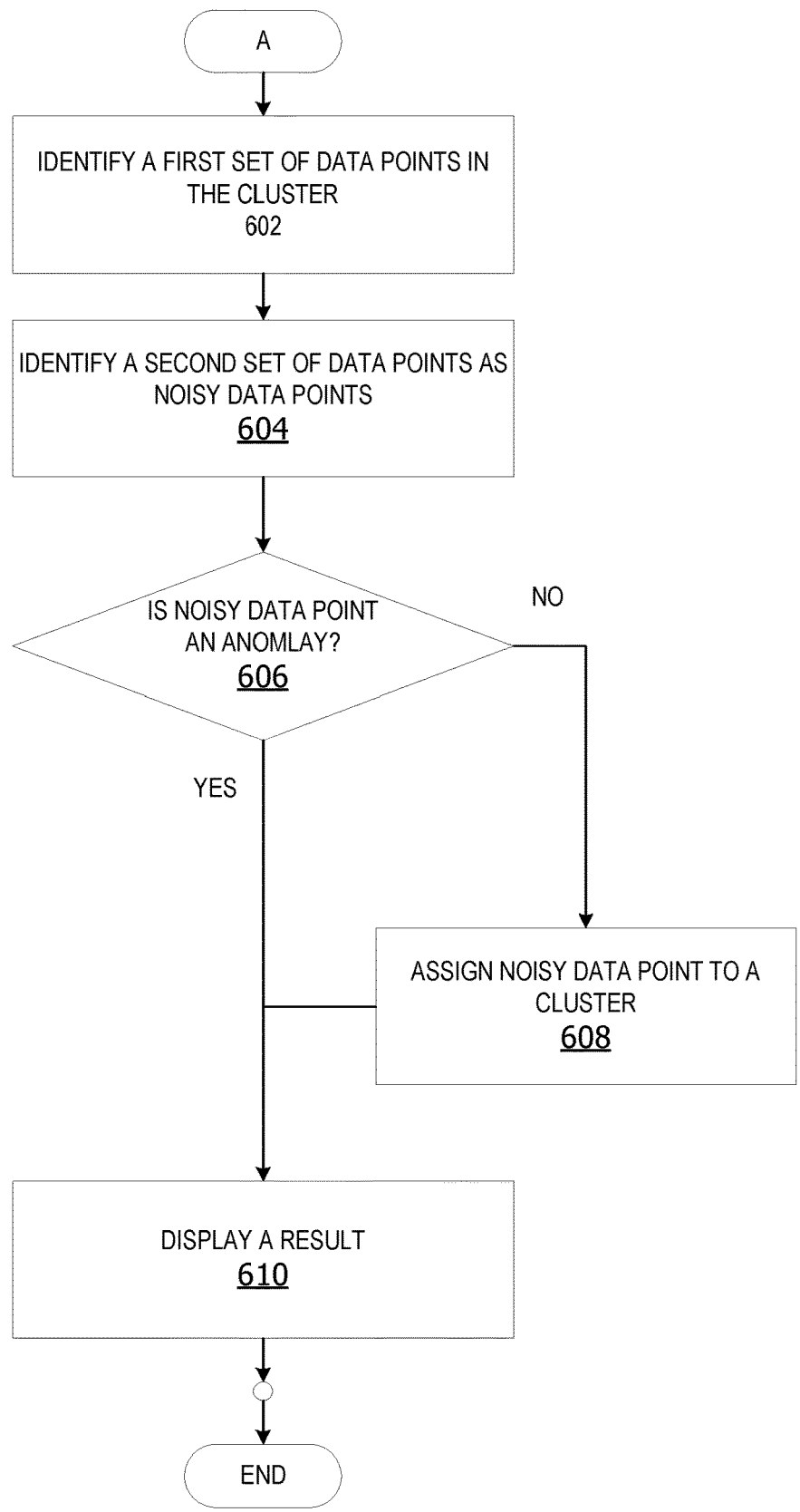
FIG. 6 is an exemplary flow chart illustrating operations of the computing device to identify anomalies in a dataset.

Referring now to FIG. 6, an exemplary flow chart 600 illustrating an operation for identifying anomalies in a dataset is provided. The process shown in FIG. 6 may be performed by the data point component 118 and the anomaly detection component 120 executing on the computing device 102 in FIG. 1. While flow chart 600 is shown as a continuation from flow chart 500, in other examples, the identification of anomalies illustrated in flow chart 600 can be performed after other clustering processes that produce clusters and noisy data points or as an independent process. Thus, one of ordinary skill in the art will appreciate that the identification of anomalies provided herein is not restricted to identifying anomalies for the process shown in FIG. 5.

At 602, a first set of data points within a cluster is identified. The first set of data points within the cluster include one or more core data points and other data points from the dataset 126 the have been identified as part of the cluster. At 604, a second set of data points outside of the cluster are identified as noisy data points. For example, any data point that is not a core data point or that is not assigned to a cluster can be identified as a noisy data point. For this reason, the processes described herein provide for a more accurate identification of noisy data points compared to conventional systems and methods when, for example, dynamic datasets (large, small, arbitrary in shape) are provided given that the identification of noisy data points depends on accurate identification of clusters. At 606, for each of the noisy data points identified, a determination is made as to whether each of the noisy data points are an anomaly. In some examples, a determination is made as to whether each of the noisy data points are an anomaly based at least in part on determining a distance between the noisy data point and other data points in the dataset 126, ranking the distances between the noisy data point and the other data points in the dataset 126, and applying a weight to each of the ranked distances to determine an outlier value for the noisy data point. The weight may be a weighted average of the noisy data point with respect to neighboring data points, wherein the neighboring data points include data points closest to the noisy data point with respect to Euclid norm. When the outlier value for the noisy data point exceeds a threshold, the noisy data point is identified as an anomaly. For example, a noisy point p as an outlier iff O(p)$\geq\theta_2$.

At 608, noisy data points that are not identified as anomalies are assigned to a particular cluster based on a Mahalanobis distance to each cluster. In other examples, the noisy data points that are not identified as anomalies are assigned to a closest cluster. By assigning remaining noisy data points (noisy data points not identified as an anomaly), the clusters provided not only more accurately reflect the data points that are provided therein, but a user can easily ascertain from looking at the clusters/graph on a display, which data points are considered anomalies/outliers. At 610, a result in the user interface 110 is displayed. In one example, the result includes each of the noisy data points in the dataset identified as an anomaly data point. In some embodiments, once the results are displayed to the user, the user may "hover" over a particular data point using a mouse/curser or a pen in case of touch screen. By hovering over a data point, information regarding the data point may be displayed to the user, for example, what the data point represents (e.g., type of data), if the data point is a core data point, a noisy data point, or an anomaly. Further, information regarding which cluster the data point belongs to may also be presented.

While the operations illustrated in FIGS. 5 and 6 are performed by the computing device 102, aspects of the disclosure contemplate performance of the operations by other entities. For example, a cloud service may perform one or more of the operations shown in FIGS. 5 and 6.

ADDITIONAL EXAMPLES

The system in some examples creates one or more clusters for a dataset of credit card transactions, whereby the anomalies identified represent fraud or errors on one or more user's accounts.

In other examples, the system creates one or more clusters for a dataset of products that indicates the date the product failed or was returned, whereby the anomalies identified represent either product defects or components of a particular product that is a defect.

The system in another example creates one or more clusters for a dataset of software data regarding performance, whereby the anomalies identified represent errors in one or more software modules.

In another example, the system creates one or more clusters for a dataset of product substitution calculations, whereby the anomalies identified represent improper/proper product substitutions.

Alternatively, or in addition to the other examples described herein, examples include any combination of the following:
  identifying a first set of data points in a cluster;
  identifying a second set of data points outside of the cluster as noisy data points;
  for each of the noisy data points, determining whether the noisy data point is an anomaly by:
  determining a distance between the noisy data point and other data points in the dataset;
  ranking the distances between the noisy data point and the other data points in the dataset;
  applying a weight to each of the ranked distances to determine an outlier value for the noisy data point;
  when the outlier value for the noisy data point exceeds a threshold, identifying the noisy data point as an anomaly;
  displaying a result in a user interface, the result comprising each of the noisy data points in the dataset identified as an anomaly data point;
  identifying a data point in the dataset as a core data point for a cluster;
  determining distances between the core data point and a threshold quantity of data points in the dataset;
  based at least on the determined distances: assigning the relative density to the cluster; and assigning the threshold quantity of data points to the cluster based at least in part on the relative density;
  wherein the noisy data points that are not identified as anomalies are assigned to a closest cluster;
  wherein the noisy data points are not assigned to any cluster;
  based at least on a relative density of a second cluster, assigning a third set of data points in the dataset to the second cluster, wherein the relative density of the second cluster is different than the relative density of the cluster;
  wherein the anomaly data point represents one of the following: a fraudulent transaction or a fault in a computing device;
  further comprising generating a warning based on the fraudulent transaction or the fault in the computing device;
  identify a first set of data points in a cluster;
  identify a second set of data points outside of the cluster as noisy data points;
  for each of the noisy data points, determine whether the noisy data point is an anomaly by:
  determining a distance between the noisy data point and other data points in the dataset;
  ranking the distances between the noisy data point and the other data points in the dataset;
  applying a weight to each of the ranked distances to determine an outlier value for the noisy data point;
  when the outlier value for the noisy data point exceeds a threshold, identifying the noisy data point as an anomaly;
  display a result in a user interface, the result comprising each of the noisy data points in the dataset identified as an anomaly data point;
  based at least on a relative density of a cluster, assigning the first set of data points in the dataset to the cluster;
  identifying a data point in the dataset as a core data point for the cluster;
  determining distances between the core data point and a threshold quantity of data points in the dataset;
  based at least on the determined distances:
  assigning the relative density to the cluster;
  assigning the threshold quantity of data points to the cluster based at least in part on the relative density;
  wherein the noisy data points that are not identified as anomalies are assigned to a closest cluster;
  wherein the noisy data points are not assigned to any cluster;
  wherein the one or more processors are further programmed to, based at least on a relative density of a second cluster, assign a third set of data points in the dataset to the second cluster, wherein the relative density of the second cluster is different than the relative density of the cluster;
  wherein the weight is a weighted average of the noisy data point with respect to neighboring data points, wherein the neighboring data points comprise data points closest to the noisy data point with respect to Euclid norm;
  wherein the noisy data points that are not identified as anomalies are assigned to a particular cluster based on a Mahalanobis distance to each cluster.

At least a portion of the functionality of the various elements in FIG. 1, FIG. 2, FIG. 3, FIG. 4, FIG. 5, and FIG. 6 may be performed by other entities (e.g., processor, web service, server, application program, computing device, etc.) not shown in FIG. 1, FIG. 2, FIG. 3, FIG. 4, FIG. 5, and FIG. 6.

In some examples, the operations illustrated in FIG. 5 and FIG. 6 may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Computer storage media, such as the memory 108, include volatile and non-volatile, removable and non-removable media implemented in any method or technology for storage of information such as computer-readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer-readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 108) is shown within the computing device 102, it will be appreciated by a person skilled in the art, that the storage may be distributed or located remotely and accessed via a network or other communication link.

Although described regarding an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for calculating competitive interrelationships between item-pairs. For example, the elements illustrated in FIG. 1, such as when encoded to perform the operations illustrated in FIG. 5 constitute exemplary means for generating clusters from a dataset, and exemplary means for identifying a data point in the dataset as a core data point for a cluster, determining distances between the core data point and a threshold quantity of data points in the dataset, and based at least on the determined distances: assigning the relative density to the cluster, and assigning the threshold quantity of data points to the cluster based at least in part on the relative density.

In addition, the elements illustrated in FIG. 1, such as when encoded to perform the operations illustrated in FIG. 6 constitute exemplary means for identifying anomalies in the dataset, and exemplary means for identifying a first set of data points in a cluster, identifying a second set of data points outside of the cluster as noisy data points, for each of the noisy data points, determining whether the noisy data point is an anomaly by: determining a distance between the noisy data point and other data points in the dataset, ranking the distances between the noisy data point and the other data points in the dataset, applying a weight to each of the ranked distances to determine an outlier value for the noisy data point, and when the outlier value for the noisy data point exceeds a threshold, identifying the noisy data point as an anomaly, and displaying a result in a user interface, the result comprising each of the noisy data points in the dataset identified as an anomaly data point.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for identifying anomalies in a dataset, the method comprising:
identifying a first set of data points in a cluster; identifying a second set of data points outside of the cluster as noisy data points; and
for each of the noisy data points, determining whether the noisy data point is an anomaly by:
determining a distance between the noisy data point and other data points in the dataset;
ranking the distances between the noisy data point and the other data points in the dataset; applying a weight to each of the ranked distances to determine an outlier value for the noisy data point; and when the outlier value for the noisy data point exceeds a threshold, identifying the noisy data point as an anomaly; and
displaying a result in a user interface, the result comprising each of the noisy data points in the dataset identified as an anomaly data point.

2. The method according to claim 1, further comprising:
identifying a data point in the dataset as a core data point for a cluster;
determining distances between the core data point and a threshold quantity of data points in the dataset; and
based at least on the determined distances: assigning a relative density to the cluster; and assigning the threshold quantity of data points to the cluster based at least in part on the relative density.

3. The method according to claim 1, wherein the noisy data points that are not identified as anomalies are assigned to a closest cluster.

4. The method according to claim 1, wherein the noisy data points are not assigned to any cluster.

5. The method according to claim 1, further comprising based at least on a relative density of a second cluster, assigning a third set of data points in the dataset to the second cluster, wherein the relative density of the second cluster is different than the relative density of the cluster.

6. The method according to claim 1, wherein the anomaly data point represents one of the following: a fraudulent transaction or a fault in a computing device.

7. The method according to claim 6, further comprising generating a warning based on the fraudulent transaction or the fault in the computing device.

8. A system for detecting anomalies in a dataset, the system comprising:
one or more processors; and a memory storing the dataset;
wherein the one or more processors are programmed to:
identify a first set of data points in a cluster; identify a second set of data points outside of the cluster as noisy data points; and
for each of the noisy data points, determine whether the noisy data point is an anomaly by:
determining a distance between the noisy data point and other data points in the dataset;
ranking the distances between the noisy data point and the other data points in the dataset; and
applying a weight to each of the ranked distances to determine an outlier value for the noisy data point; and
when the outlier value for the noisy data point exceeds a threshold, identifying identify the noisy data point as an anomaly; and
display a result in a user interface, the result comprising each of the noisy data points in the dataset identified as an anomaly data point.

9. The system according to claim 8, wherein the one or more processors are further programmed to:
identify a data point in the dataset as a core data point for a cluster;
determine distances between the core data point and a threshold quantity of data points in the dataset; and
based at least on the determined distances:
assigning a relative density to the cluster; and
assigning the threshold quantity of data points to the cluster based at least in part on the relative density.

10. The system according to claim 8, wherein the noisy data points that are not identified as anomalies are assigned to a closest cluster.

11. The system according to claim 8, wherein the noisy data points are not assigned to any cluster.

12. The system according to claim 8, wherein the one or more processors are further programmed to, based at least on a relative density of a second cluster, assign a third set of data points in the dataset to the second cluster, wherein the relative density of the second cluster is different than the relative density of the cluster.

13. The system according to claim 8, wherein the weight is a weighted average of the noisy data point with respect to neighboring data points, wherein the neighboring data points comprise data points closest to the noisy data point with respect to Euclid norm.

14. The system according to claim 8, wherein the noisy data points that are not identified as anomalies are assigned to a particular cluster based on a Mahalanobis distance to each cluster.

15. One or more computer storage media storing computer-executable components for detecting anomalies in a dataset, the components comprising:
a data point component that when executed by one or more processors causes the one or more processors to:
identify a first set of data points in a cluster; and
identify a second set of data points outside of the cluster as noisy data points;
an anomaly detection component that when executed by the one or more processors causes the one or more processors to:
for each of the noisy data points, determine whether the noisy data point is an anomaly by:
determining a distance between the noisy data point and other data points in the dataset;
ranking the distances between the noisy data point and the other data points in the dataset;
applying a weight to each of the ranked distances to determine an outlier value for the noisy data point; and
when the outlier value for the noisy data point exceeds a threshold, identifying the noisy data point as an anomaly; and
a user interface component that when executed by the one or more processors cause the one or more processors to display a result in a user interface, the result comprising each of the noisy data points in the dataset identified as an anomaly data point.

16. The one or more computer storage media of claim 15, wherein the data point component further causes the one or more processors to identify a data point in the dataset as a core data point, and wherein the one or more computer storage media further comprises a cluster component that when executed by the one or more processors cause the one or more processors to:
 identify a data point in the dataset as a core data point for a cluster;
 determine distances between the core data point and a threshold quantity of data points in the dataset; and
 based at least on the determined distances:
  assign a relative density to the cluster; and
  assign the threshold quantity of data points to the cluster based at least in part on the relative density.

17. The one or more computer storage media of claim 16, wherein the cluster component further causes the one or more processors to, based at least on a relative density of a second cluster, assign a third set of data points in the dataset to the second cluster, wherein the relative density of the second cluster is different than the relative density of the cluster.

18. The one or more computer storage media of claim 15, wherein the noisy data points that are not identified as anomalies are assigned to a closest cluster.

19. The one or more computer storage media of claim 15, wherein the noisy data points are not assigned to any cluster.

20. The one or more computer storage media of claim 15, wherein the weight is a weighted average of the noisy data point with respect to neighboring data points, wherein the neighboring data points comprise data points closest to the noisy data point with respect to Euclid norm.

* * * * *